United States Patent Office 3,494,027
Patented Feb. 10, 1970

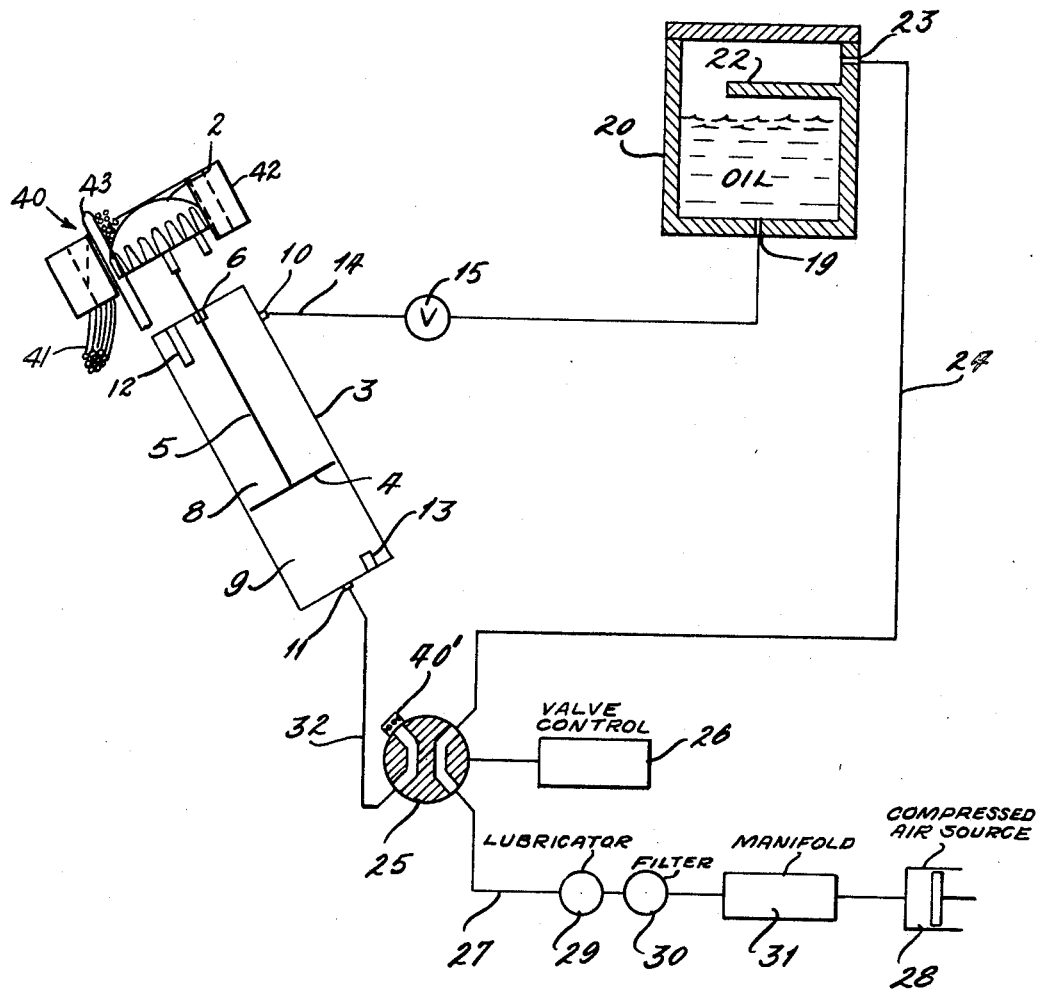

3,494,027
COIL INSERTER HAVING AN OIL DAMPED AIR CYLINDER ACTUATOR
Robert G. Harelson, Florissant, Mo., assignor to Emerson Electric Co., St. Louis, Mo., a corporation of Missouri
Filed Nov. 20, 1967, Ser. No. 684,171
Int. Cl. H02k 15/00
U.S. Cl. 29—606
6 Claims

ABSTRACT OF THE DISCLOSURE

An actuator for a ram of a machine which inserts coils into electric motor stator cores. A power cylinder having a piston dividing the cylinder into an upper oil filled chamber and a lower air filled chamber. A restriction line from an upper entry in the power cylinder to an oil reservoir. A 4-way valve, alternately connecting an upper entry in the oil reservoir with a standard industrial source of compressed air and a lower entry in the power cylinder with the ambient atmosphere for a downward power stroke of the piston, and then connecting the lower entry of the power cylinder with the source of compressed air and the upper entry of the oil reservoir with the ambient atmosphere for an upward power stroke of the piston rod. The primary, upward, power stroke is therefore air powered and oil damped.

BACKGROUND OF THE INVENTION

This invention relates to an actuator for providing a smoothly operating reciprocating power source and in particular to an oil damped air cylinder actuator. It has particular, but not exclusive, application to an actuator for a machine which automatically inserts coils axially into electric motor stator cores.

Machines for automatically inserting coils axially into stator cores, known as coil inserters, have greatly simplified the process of winding the stator cores of dynamo-electric machines, particularly electric motors. The basic principles of the method commonly used are set out in the U.S. Patent to Adamson, No. 2,432,267. A description of machines, used during the past decade is set out in Hill Patent No. 3,324,536. Coil inserters utilizing this method generally have a cylindrical array of axially parallel fingers. One end of the fingers is mounted on a base, and a free end of the fingers extends upwardly. The diameter of the cylinder of fingers is such and the fingers are so proportioned that each finger will engage and cover the inside face of a single tooth of the stator. A fluted impeller is slidably mounted within the cylinder of fingers, and the fillets of the impeller extend through gaps between the fingers. The impeller is mounted on the free end of a piston rod which permits travel of the impeller from a lower position several inches below the free end of the cylinder of fingers to an upper position slightly above the free end of the cylinder of fingers. In use, preformed coils are placed over the fingers, with the desired number of fingers between the sides of each coil. The loose ends of the coils hang outboard of the cylinder of fingers. A stator core is then slipped over the cylinder of fingers, with each finger engaging a tooth of the stator, until the core engages a stop. The stator core is clamped down, the actuator for the piston rod is energized, and the piston rod forces the impeller upward. The fillets on the impeller engage the coils and force them into position in the slots between the stator teeth. The impeller is then returned to its lower position, the upper ends of the coils are bent outward, the clamps are removed from the stator, and the wound stator is removed from the coil inserter. Additional apparatus for simultaneously inserting bore wedges with the coil is generally provided on the coil inserter. Such an arrangement is shown by Hill, No. 3,324,536.

The actuator for driving the piston rod and impeller of a coil inserted of the type described must have a smooth and rather powerful stroke. These characteristics are particularly necessary when coils of relatively heavy gauge wire are to be inserted. If the impeller or actuator "hangs up" as coils are inserted, the wires in the coils tend to be cut or become tangled. For this reason, it has been necessary to use hydraulic actuators to drive the impellers of coil inserters. The cost of such hydraulic actuators has greatly increased the cost of coil inserters. The tendency of air cylinder actuators to hang up, however, has prevented their use in commercial practice.

One of the objects of this invention is to provide an actuator which can utilize ordinary industrial compressed air as a source of power, but which will perform smoothly.

Other objects will become apparent to those skilled in the art in the light of the following description and accompanying drawing.

SUMMARY OF THE INVENTION

In accordance with this invention, generally stated, an actuator for driving the impeller of a coil inserting machine of the character described is provided comprising a sealed cylinder of any cross-sectional shape, a piston slidably mounted in the cylinder and dividing the cylinder into a first chamber and a second chamber, and a piston rod attached to the piston and extending through the end wall of one of the chambers. A port is provided in each of the chambers. One port is connected through a restriction to the lower, liquid filled, portion of a liquid reservoir, partially filled with liquid. The second port is alternately connected to a source of compressed air and to the atmosphere.

In the preferred embodiment, the upper, air filled, portion of the liquid reservoir is alternately vented to the atmosphere, when the second port in the cylinder is connected to the compressed air source, and connected to the compressed air source, when the second port is vented to the atmosphere. Also in the preferred embodiment the alternate venting and connecting to the compressed air source of the second port and of the air filled portion of the liquid reservoir is accomplished by means of a four-way valve.

Also in the preferred embodiment the first port in the cylinder is in the chamber through the end wall of which the piston rod passes. Also in the preferred embodiment, the piston rod carries the impeller of an axial coil inserter.

BRIEF DESCRIPTION OF THE DRAWING

The drawing is a diagrammatic view of one illustrative embodiment of actuator of this invention.

DESCRIPTION OF THE PREFERRED EMBODIMENT

Referring now to the drawing, it indicates one illustrative embodiment of an actuator of this invention, adapted to drive an impeller 2 of a coil inserter 40. The actuator includes a cylinder 3 in which a piston 4 is mounted fluid-tightly but slidably. A piston rod 5 connected to the piston 4 extends through a seal 6 in an upper wall 7 of the cylinder 3. An upper chamber 8 and a lower chamber 9 in the cylinder 3 are separated by the piston 4. An upper port 10 and a lower port 11 are provided in the chambers 8 and 9 respectively. Stop means 12 and 13 in the cylinder 3 prevent the piston 4 from obstructing the port 10 and the port 11. On the free end of the piston rod 5 is mounted the impeller 2 of the coil inserter. Connected to the upper port 10 is a control line 14 to a port 19 in the lower wall of a reservoir 20. A shutoff valve 15 is provided in the control line 14. The chamber 8, the control line 14, and the lower portion of the reservoir 20 are filled with oil. The upper portion of the reservoir 20 is filled with air and is interrupted from the lower portion by a baffle 22 positioned above the uppermost level which oil is expected to reach in the reservoir. An air port 23 in the upper portion of the reservoir 20 is connected by an air line 24 to a four-way valve 25 controlled by a foot pedal 26. The four-way valve 25 alternately connects the air filled portion of the reservoir with the ambient atmosphere through a vent 40' and with a compressed air line 27. The compressed air line 27 communicates with a source of compressed air 28 through a lubricator 29, a filter 30, and a manifold 31. The lower port 11 in the lower chamber 9 of the cylinder 3 communicates through a line 32 with the four-way valve 25, and through the 4-way valve 25 alternately with the compressed air line 27 and the ambient atmosphere. The four-way valve 25 is so arranged that when the lower chamber 9 of the cylinder 3 communicates with the source of compressed air 28 the air filled half of the reservoir 20 communicates with the ambient atmosphere. The compressed air source 28 may conveniently be the compressed air commonly supplied to air hoses throughout a factory from a central source, at a pressure of about 90 pounds. The cylinder 3 may conveniently have an inside diameter of six inches.

In operation, if the impeller is initially in ts lower postion, the coils 41 to be inserted in a stator core 42 are placed in their proper positions over fingers 43 of the inserter 40, the stator core 42 is placed in position over the coils 41, the stator core 42 is clamped down and the foot pedal 26 is depressed. The four-way valve 25 revolves 90° from the position shown in FIGURE 1, compressed air from the source 28 is forced into the lower chamber 9 of the cylinder, the piston 4 rises slowly, and the oil in the upper chamber 8 of the cylinder is forced through the control line 14 into the reservoir 20. Because the oil flows slowly through the control line, the piston rises at a constant rate and the air pressure on it is maintained at nearly the static pressure. The impeller 2 rises smoothly and forces the coils into the slots in the stator. When the foot pedal 26 is again depressed, the four-way valve 25 turns another 90°, venting the lower chamber 9 and connecting the reservoir to the compressed air source, compressed air from the compressed air source 28 is forced into the air filled portion of the reservoir 20 forcing oil back through the control line 14, and the piston 4 is forced down. The stator is then removed from the coil inserter.

It will be seen that the rate at which the piston 4 is moved will depend on the extent of the restriction by the control line 14 and on the viscosity of the oil in that line. In this illustrative embodiment, a control line about ⅜" in diameter and about 18" in length is used. Hydraulic oil with a viscosity of about 60.4 Saybolt seconds at 100° F. and 35.0 Saybolt seconds at 210° F. is suitable with a control line of these proportions. Such an oil is sold commercially as Gulf-Spin 35.

Numerous variations in the construction of the actuator of this invention, within the scope of the appended claims, will occur to those skilled in the art in the light of the foregoing disclosure. For example, the conduit to the second chamber of the cylinder (in the illustrative embodiment, the line 32 to the lower chamber 9) may also include a reservoir partially filled with oil, and the second chamber may also be filled with oil. In such an arrangement, the piston and cylinder system can be made substantially symmetrical in operation, so that if it is found desirable to do so, dual piston rods and an operating element such as the impeller 2 of the illustrative embodiment can be provided at both ends of the cylinder, to make the cylinder double acting. It is also possible, though less desirable, to reverse the position of the cylinder chambers of the preferred embodiment with respect to the piston rod and impeller, using the flow of oil through the line 14 in response to the gas pressure in the reservoir 20 to move the piston on the power stroke. A disadvantage of this arrangement is that the "restoring" gas pressure in the cylinder on the return stroke is confined by an unlubricated gland around the piston rod. Liquids other than oil may be used in the reservoir or reservoirs and compressed gases other than centrally supplied compressed air may be fed into the conduit to the second chamber of the cylinder. A control valve or other variable restricting means may be included in the control line, for adjustment of the speed at which the piston rod travels. For many applications, including driving the impeller of a soil inserter, the pressure used for forcing the piston back down does not need to be great. Therefore, the pressure source feeding the "air filled" half of the reservoir need not be the same source that feeds the conduit to the second chamber of the cylinder. The upper half of the reservoir may be vented continuously and the weight of the piston relied upon for returning it to the lower position, or the upper half of the reservoir may be sealed and the pressure generated in the upper half during the upward stroke of the piston used to push it back down. These variations are merely illustrative.

Having thus described the invention, what is claimed and desired to be secured by Letters Patent is:

1. A method of inserting coils axially into a stator core of a dynamo-electric machine wherein an impeller engages the coils and forces the coils into said stator, which comprises moving said impeller by means of an oil damped air cylinder actuator, said actuator comprising a cylinder; a piston rod extending through an end wall of said cylinder; a piston attached to said piston rod, said piston being slidably mounted in said cylinder and dividing said cylinder into a first chamber and a second chamber; a liquid reservoir communicating with said first chamber; a liquid filling said first chamber, and partially filling said reservoir, said liquid filling said first chamber communicating with said liquid partially filling said reservoir through a restriction; a conduit communicating with said second chamber; a source of compressed gas selectively connected to said conduit, and a control valve in said conduit, said control valve connecting said conduit alternately with said source of compressed gas and with an outlet.

2. The method of claim 1 wherein the compressed gas is compressed air and the outlet is to the ambient atmosphere.

3. The method of claim 1 wherein said impeller of said coil inserter is mounted on the free end of said piston rod.

4. The method of claim 2 wherein said reservoir is fluid tight and has a chamber partially filled with air, said chamber communicating alternately with the ambient atmosphere and with a source of compressed air as the conduit communicates with the source of compressed air and ambient atmosphere respectively.

5. The method of claim 1 wherein said restriction causes the pressure exerted by said actuator to be nearly equal to the static pressure of said compressed gas when said control valve connects said conduit with said source of compressed gas.

6. A coil inserting machine for inserting coils axially into the stator core of a dynamo-electric machine, comprising an impeller for engaging the coils and forcing them into said stator during a power stroke of said impeller and an actuator for driving said impeller on said power stroke and thereafter returning it to a retracted position, said actuator comprising a cylinder; a piston rod extending through an end wall of said cylinder; a piston attached to said piston rod, said piston being slidably mounted in said cylinder and dividing said cylinder into a first chamber and a second chamber; a liquid reservoir communicating with said first chamber; a liquid filling said first chamber, and partially filling said reservoir, said liquid filling said first chamber communicating with said liquid partially filling said reservoir through a restriction; a conduit communicating with said second chamber; a source of compressed gas selectively connected to said conduit, and a control valve in said conduit, said control valve being adapted to connect said conduit alternately with said source of compressed gas for said power stroke and with an outlet for returning said impeller to said retracted position.

References Cited

UNITED STATES PATENTS

| | | | |
|---|---|---|---|
| 3,286,311 | 11/1966 | Rhoods | 91—4 |
| 2,432,267 | 12/1947 | Adamson | 29—205 X |
| 3,324,536 | 6/1967 | Hill | 29—606 X |

THOMAS H. EAGER, Primary Examiner

U.S. Cl. X.R.

29—205; 91—4